United States Patent
Herrig et al.

(10) Patent No.: US 12,276,250 B2
(45) Date of Patent: Apr. 15, 2025

(54) NOISE REDUCING WIND TURBINE BLADE

(71) Applicant: LM WIND POWER A/S, Kolding (DK)

(72) Inventors: Andreas Herrig, Salzbergen (DE); Trevor Howard Wood, Schenectady, NY (US); Guannan Wang, Salzbergen (DE)

(73) Assignee: LM WINDPOWER A/S, Kolding (DK)

( * ) Notice: Subject to any disclaimer, the term of this patent is extended or adjusted under 35 U.S.C. 154(b) by 0 days.

(21) Appl. No.: 18/286,886

(22) PCT Filed: May 3, 2022

(86) PCT No.: PCT/EP2022/061761
§ 371 (c)(1),
(2) Date: Oct. 13, 2023

(87) PCT Pub. No.: WO2022/233815
PCT Pub. Date: Nov. 10, 2022

(65) Prior Publication Data
US 2024/0384700 A1 Nov. 21, 2024

(30) Foreign Application Priority Data
May 6, 2021 (EP) .................................. 21172504

(51) Int. Cl.
*F03D 1/06* (2006.01)
(52) U.S. Cl.
CPC ....... *F03D 1/06495* (2023.08); *F03D 1/0675* (2013.01); *F05B 2240/3042* (2020.08); *F05B 2260/96* (2013.01)

(58) Field of Classification Search
CPC .. F03D 1/06495; F03D 1/0675; F03D 1/0633; F03D 1/0641; F03D 1/0677;
(Continued)

(56) References Cited

U.S. PATENT DOCUMENTS 10,240,576 B2 * 3/2019 Drack ................... F03D 1/0641
10,746,157 B2 * 8/2020 Wang .................... F03D 1/0633
(Continued)

FOREIGN PATENT DOCUMENTS

CN 109356802 A 2/2019
CN 115126649 A * 9/2022
(Continued)

OTHER PUBLICATIONS

Cao et al. CN 115126649_English Machine Translation_ Espacenet (Year: 2022).*

*Primary Examiner* — David E Sosnowski
*Assistant Examiner* — Wayne A Lambert
(74) *Attorney, Agent, or Firm* — Nath, Goldberg & Meyer; Tanya E. Harkins

(57) ABSTRACT

A wind turbine blade (10) comprising a pressure side (24) and a suction side (26), a leading edge (18) and a trailing edge (20). At least a portion of the blade (10) located in a trailing edge region (142) at or adjacent to the trailing edge (20) is a noise reducing portion defining an exposed surface and comprising a plurality of sound reducing or sound absorbing acoustic resonators (58), each of the resonators (58) comprising an opening (55) in the exposed surface and a cavity (56) having a length L between the opening (55) and a bottom (57) of the cavity opposite the opening (55).

20 Claims, 12 Drawing Sheets

(58) Field of Classification Search
CPC .... F03D 1/0679; F03D 1/0681; F03D 1/0682; F03D 1/0684; F03D 1/0685; F03D 1/0687; F03D 1/069; F03D 7/0232; F03D 80/301; F03D 80/005; F05B 2240/3042; F05B 2240/301; F05B 2240/305; F05B 2240/3052; F05B 2240/306; F05B 2240/3062; F05B 2260/96
See application file for complete search history.

(56) References Cited

U.S. PATENT DOCUMENTS

| | | |
|---|---|---|
| 2008/0080977 A1 | 4/2008 | Bonnet |
| 2010/0143151 A1* | 6/2010 | Kinzie .................. F03D 1/0675 416/248 |
| 2011/0142635 A1* | 6/2011 | Fritz ..................... F03D 1/0675 416/62 |
| 2014/0286784 A1* | 9/2014 | Singh ................... F03D 1/0675 416/228 |
| 2015/0050154 A1* | 2/2015 | Dixon .................... F01D 5/147 416/223 A |
| 2018/0216600 A1* | 8/2018 | Zamora Rodriguez ..................... F03D 1/0633 |
| 2019/0389128 A1* | 12/2019 | Doolan ................ B29C 64/153 |

FOREIGN PATENT DOCUMENTS

| | | | |
|---|---|---|---|
| EP | 1314885 A1 | 5/2003 | |
| EP | 1662137 A1 | 5/2006 | |
| EP | 2783103 A1 | 10/2014 | |
| EP | 3098436 A1 * | 11/2016 | ........... F03D 1/0633 |
| WO | WO-2014207015 A1 * | 12/2014 | ........... F03D 1/0633 |
| WO | 2015192915 A1 | 12/2015 | |

\* cited by examiner

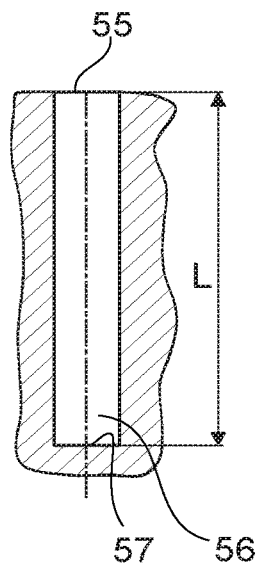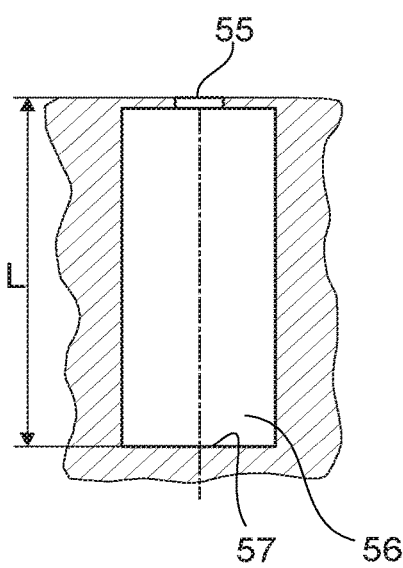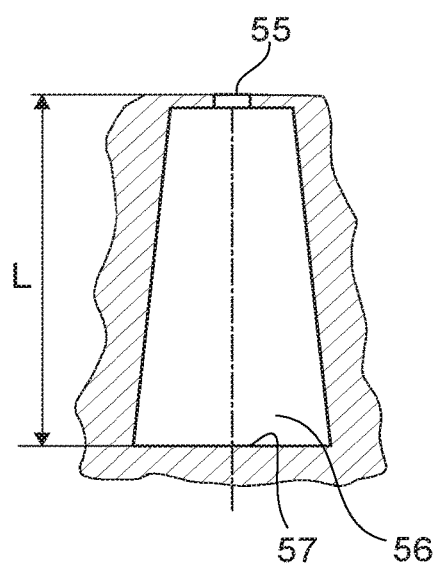
Fig. 6a    Fig. 6b    Fig. 6c
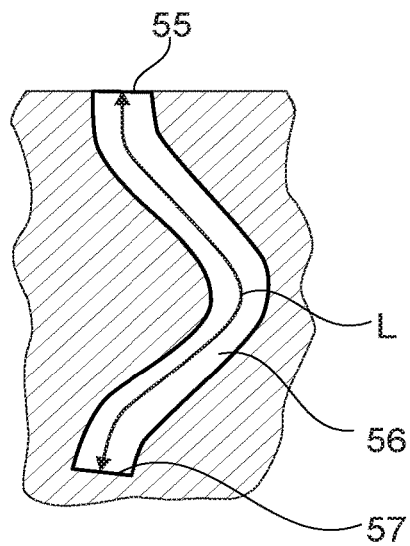
Fig. 6d
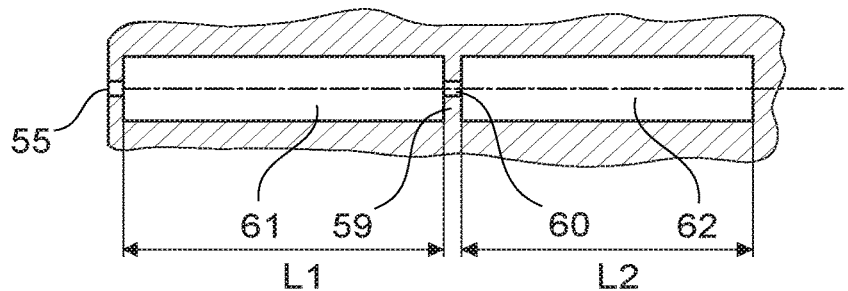
Fig. 6e

NOISE REDUCING WIND TURBINE BLADE

This is a National Phase Application filed under 35 U.S.C. 371 as a national stage of PCT/EP2022/061761 filed on May 1, 2022, an application claiming priority to European patent application No. 21172504.9, filed on May 6, 2021, the entire content of each of which is incorporated herein by reference.

FIELD OF THE INVENTION

The present invention relates to a wind turbine blade having sound or noise reducing means configured to reduce noise emitted at the trailing edge of the blade.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency.

One of the continued considerations for wind turbine blade design is the operational noise produced when such blades rotate, in particular for onshore wind turbine installations. A large portion of the noise produced during wind turbine operation is due to turbulence in the boundary layer developing over the blade surface along the airfoil chord and passing over the trailing edge of a wind turbine blade. There, the wall pressure fluctuations created by the relatively high level of turbulent kinetic energy in the boundary layer lead to scattering of sound waves from the trailing edge, which produces broadband far-field noise.

As modern wind turbine blades are manufactured with increasingly longer blade lengths, the longer span of the blades results in higher relative wind speeds experienced by the blades. Accordingly, this can lead to relatively large levels of trailing edge noise, as its intensity grows with roughly the fifth power of the flow velocity. Hence, noise reducing devices and associated blade designs are increasingly desired, to be able to allow tip speed increases, which enable a lighter and cheaper blade and turbine design with larger design tip speed ratio.

To this end, modern wind turbine blades are often provided with serrations along the blade trailing edges, in an effort to reduce blade trailing edge noise and/or to improve wind turbine blade efficiency, as can be seen in EP1314885. The serrations are typically provided by attaching a serrated panel at the trailing edge of the wind turbine blade. While the noise mitigating properties of such serrations are advantageous, several drawbacks remain. Often, finding the right serration geometry is a trade-off between noise mitigation performance, structural and manufacturing requirements and cost.

There are several ways of attaching a panel to the trailing edge of the blade. US 2011/0142635 A1 describes a blade extension panel provided with a cutaway mounting portion for mounting the extension panel to the blade such that the blade extension is substantially flush with a surface of the blade.

Furthermore, a plurality of on-surface addons for guiding air at the trailing edge area have been proposed for noise mitigation.

However, there is still a need for providing noise reducing means or devices for reducing the trailing edge noise of a wind turbine blade, as noise limits set by regulations tend to become stricter and more application space is desired for wind turbines, bringing them closer to residences.

In this, the value of blade noise reductions translates into significant value of a wind turbine, when power curtailments in noise reduced operations are less necessary or altogether avoidable.

The noise benefit achieved by better performing serrations can therefore allow manufacturers to spend more on serrations incorporating advanced noise reduction technology, which will increase the serration material cost, but still improve turbine value due to Annual Energy Production (AEP) gains and improved application space.

SUMMARY OF THE INVENTION

It is an object of the present invention to provide means at the trailing edge of a wind turbine blade improving the noise mitigation.

The present inventors have found that the above object may be achieved by a wind turbine blade having a profiled contour and comprising a pressure side and a suction side, a leading edge and a trailing edge, a chord having a chord length extending between the leading edge and the trailing edge, the blade extending in a spanwise direction between a root end and a tip end and having a longitudinal axis, wherein at least a portion of the blade located in a trailing edge region at or adjacent to the trailing edge is a noise reducing portion defining an exposed surface and comprising a plurality of sound reducing or sound absorbing acoustic resonators, each of the resonators comprising an opening in the exposed surface and a cavity having a length between the opening and a bottom of a bottom wall of the cavity opposite the opening, the opening to the cavity having an opening cross-sectional shape defining an opening cross-sectional area and the cavity having a cavity cross-sectional shape defining a cavity cross-sectional area.

The trailing edge region may include the trailing edge and 1%, 5%, 10%, 20%, 30%, 40% or 50% of the local chord length upstream of the trailing edge.

The resonators can be configured and dimensioned so that the sound(s) waves emitted by the resonator is approximately 180° out of phase with incoming sound waves. Thereby it is possible to reduce the noise emitted from different parts of the wind turbine blade by providing different resonators having different dimensions and being configured and tuned to abate the frequency range of the sound to be abated, ideally the frequency range that contributes most significantly to the overall noise level. As a result, it is possible to obtain an optimal reduction of the sound emitted by the blades of a wind turbine during operation of the wind turbine.

The resonators may be arranged close to the sound source region of the blade emitting the sound to be abated by the resonators. It is believed and has been demonstrated that an optimal noise reduction is obtained, when the opening of the resonator or resonators are arranged close to the source emitting the noise to be abated by the resonator or resonators in question, because the most significant portion of energy can be extracted from the coupled hydrodynamic and acoustic field.

By the term "close to the noise source region of the blade emitting the sound" is to be understood "between 0-to 40% the local chord length, such as 0 to 30%, 20%, 10%, 5%, or 1% of the local chord length from the sound source region emitting the noise".

The cross-sectional area of the cavity can be essentially the same as that of the cavity opening.

The cross-sectional area of the cavity can be larger than that of the cavity opening.

The cross-sectional area of the cavity can be smaller than that of the cavity opening.

The cross-sectional area of the cavity may be essentially constant over the entire length thereof, or it can vary, influencing the tuned frequency range.

The cross-sectional shape of the cavity can be essentially the same as that of the cavity opening.

The cross-sectional shape can be essentially the same over the entire length of the cavity.

The cavity may have an elongated shape, the length of the cavity being longer than the transverse dimension of the cavity.

The length of the cavity is also of importance for the target frequency range.

By combining cavities of different lengths, addressing respectively tuned frequencies, the frequency range of overall noise attenuation can be broadened.

The cavity of the resonator can comprise one or more transverse partition walls between the bottom and the opening thereof, the partition wall(s) dividing the cavity into two or more cavity parts, such as an outer cavity part proximal to the cavity opening and an inner cavity part proximal to the cavity bottom, and each transverse partition wall being provided with at least one dividing wall opening.

The cavity opening(s) can be arranged centrally or not centrally in the partition wall.

The partition wall(s) may comprise a plurality of mutually spaced cavity openings.

The length of the cavity parts, such as the outer and inner cavity part, can be the same or different. As a result, the resonator can abate emitted sound of different wavelengths and frequencies by dimensioning the cavity and the cavity parts accordingly.

At least some of the cavity openings can be covered by a fluid permeable layer, such as a fabric layer, a wire mesh, or a perforated screen/facesheet.

Thereby, the impedance of the resonators and their frequency response can be tuned and the sound absorption can be extended over a larger frequency range.

Further, it can be avoided that particles and dust, insects or water (hydrophobic coatings on the permeable layer) enter the resonators and reduce their ability to abate sound from sound sources of the blade. The porous layer may also be used to provide a certain resistance to the flow oscillating in and out of the cavity, thereby allowing to tune its frequency response and optimize the absorption.

At least one of the plurality of resonators can be a quarter wavelength resonator, such as a resonator with a cavity having constant transverse dimension, and having a cross-sectional dimension being smaller than the length, such as at least 4, 6, 8 or 10 times smaller than the length of the cavity.

For a quarter wavelength resonator having a constant transverse dimension being small compared to the wavelength of the sound, the wavelength $\lambda$ can theoretically be calculated as approximately 4 L, L being the length of the resonator cavity or chamber, and the frequency f can theoretically be calculated as approximately sound speed/4L. With a sound speed of approximately 340 m/s, the frequency f can be calculated as approximately 340 m/s/4L, and the length L of the cavity can be calculated as approximately 340 m/s/4f.

From the above it can be seen that relatively long cavities are needed for abating low frequencies. Thus, for abating a frequency of 425 Hz a cavity length L of approximately 200 mm is needed and for abating a frequency of 850 Hz a cavity length L of approximately 100 mm is needed and for abating a frequency of 1200 Hz a cavity length of approximately 70 mm is needed.

At least one of the plurality of resonators may comprise a cavity having a length of at least 70 mm. Thereby, noise with a frequency lower than 1200 Hz can be abated.

The smallest cross-sectional dimension, w, of a resonator of constant cross-sectional area is typically chosen such that acoustics in the resonator at the tuned frequency of interest is predominantly one-dimensional ($w/L<0.1$ roughly) yet not so small that the acoustic boundary layer contributes significantly to the net resistance (hence $w/L>0.01$ roughly).

A resonator can, in principle, have any cross-sectional shape. However, the cross-sectional shape of the resonator may typically be circular, elliptical, trapezoidal, hexagonal or rectangular.

At least one of the plurality of resonators can comprise a cavity being straight, i.e. having a straight resonator axis extending between the cavity opening and the cavity bottom.

The resonator axis of the at least one resonator can be slanted relative to the local chord, such as in a flap wise or spanwise direction.

The cavity of the at least one cavity can, however, also be stretched out in a chord wise direction or in a direction being essentially parallel to the local chord.

In certain areas of the blade the desired length of the resonator cavity is obtainable by a straight resonator extending in or parallel to the local chord. However, in other areas of the blade a sufficient length of the resonator cavity is obtainable by slanting the straight resonator relative to the local chord, flap wise or span wise.

At least one of the plurality of resonators may be curved, i.e. comprise a cavity having a cavity axis being curved for obtaining the desired length of the cavity.

The resonator can have meander shape, undulated shape, U-shape or spiral shape for obtaining a sufficient length of the cavity for abating low frequencies.

At least one of the plurality of resonators can be essentially spiral-shaped having a spiral shaped cavity.

At least one of the plurality of resonators can be U-shaped having a U-shaped cavity comprising a first cavity part and a second cavity part and a passage between the first and the second cavity part.

The bottom wall of the cavity of a resonator can form a second bottom of a second cavity of a second resonator formed in continuation of the resonator, the second sound absorbing or reducing resonator comprising a second opening in the noise reducing exposed surface of the blade.

The second cavity of the second resonator can have a smaller or larger length than or the same length as that of the cavity. Thereby the resonator and the second resonator may abate, reduce or absorb noise of different frequencies.

By means of an array of resonators with predetermined different lengths it is possible to abate noise within a given frequency band and thereby abate any noise emitted at the trailing edge of the blade.

The trailing edge of the blade may comprise at least one serrated portion extending at least over a portion between the tip and the root of the blade, the serrated portion comprising a plurality of serrations including a first serration and a second serration, and the noise reducing portion is located in or comprises the at least one serrated portion, at least some of the resonators being arranged in the first and/or second serration.

The advantage obtained by arranging acoustic resonators in the serration is the noise reduction that may be obtained by the serrations which are further reduced by the acoustic resonators. Also, the resonators can be positioned in closest proximity to the noise source region on a blade with serrations. The strongest source with serrations is typically remaining at the trailing edge location, respectively in the valley of the serration teeth.

Further, with resonators integrated in serrations and/or 2-dimensional chord extensions, they can be attached to an existing wind blade as an add-on without intruding into the structure, keeping the effort and cost of such an enhancement low.

Each of the first serration and the second serration can comprise
- a base,
- an apex located downstream of the base portion,
- a first lateral serration side extending between a base portion and the apex,
- a second lateral serration side arranged opposite the first lateral serration side and extending between the base and the apex,
- a serration pressure surface side extending between the base, the first lateral serration side and the second lateral serration side, and
- a serration suction side arranged opposite the serration pressure side and extending between the base,
- the first lateral serration side and the second lateral serration side.

The serration pressure side can be considered a continuation of and forming a portion of the pressure side of the blade, and the serration suction side can be considered a continuation of and forming a portion of the suction side of the blade.

On the other hand, the sides of the serrations, especially the serration pressure side and the serration suction side, can also be considered extending upstream of the base portion of the serrations, which means that the resonators can also be arranged in the pressure side and the suction side upstream of the base portion of the serrations.

The first serration and the second serration can be arranged adjacent to each other, such that a valley region is formed between the first lateral serration side of the first serration and the second lateral serration side of the second serration or vice versa.

At least some of the resonators arranged in the first and the second serration may be arranged in the first lateral serration side and/or the second lateral serration side thereof.

Some of the resonators arranged in the first and/or second lateral serration side can be arranged adjacent to or at the base of the serration and thereby also at or adjacent to a nadir in the valley between two serrations.

The resonators arranged in the first and/or second lateral serration side of the serrations can be linear resonators extending essentially parallel to the local chord, or be undulated resonators, such as S-shaped resonators, extending in the direction of the local chord. However, they can also be undulated resonators, such as S-shaped resonators, extending from one of the lateral serration sides towards the opposite lateral serration side. The resonators can also be spiral-shaped. The spiral-shaped resonators can have a spiral axis being essentially parallel to or coincide with the local chord.

At least some of the resonators arranged in the first and the second serration can be arranged in the serration pressure side and/or the serration suction side.

The serrations can have a rounded cross-sectional shape, such as a rounded rectangular shape. an elliptical or circular cross-sectional shape and taper towards the apex.

Thus, the shape of the serrations can be essentially conical.

The trailing edge of the blade may comprise a straight portion extending at least over a portion between the tip and the root of the blade, and the noise reducing portion may be located upstream of the straight portion.

The noise reducing portion can comprise an array of resonators.

The array of resonators can be arranged in rows and columns.

The noise reducing portion of the blade can be formed by a premanufactured part being integrated in the blade.

It may be advantageous to produce the noise reducing portion as a separate part, as it can be produced by manufacturing processes that are normally not used for producing a wind turbine blade. Thus, the noise reducing part can be produced as a relatively small part by an injection moulding process, for example, or an extrusion process with subsequent closing of the cavities and re-shaping by thermoforming or by a casting process using flexible moulds or moulds with lost cores or by 3D-printing and a number of said small parts can be assembled to the desired size and integrated in the blade.

The premanufactured part may be integrated in the blade during manufacturing of the blade.

Alternatively, the premanufactured part can be added to an existing previously manufactured blade as an add-on or retrofitted part and thereby integrated in the blade after manufacturing of the blade.

BRIEF DESCRIPTION OF THE FIGURES

Embodiments of the invention will be described in more detail in the following with reference to the accompanying figures. The figures show one way of implementing the present invention and are not to be construed as being limiting to other possible embodiments falling within the scope of the attached claim set.

The invention is explained in detail below with reference to embodiments or examples shown in the drawings, in which

FIG. 6a illustrates an example of a resonator where the cross-sectional area and shape is essentially the same as that of the cavity opening, FIG. 6b illustrates an example of a resonator where the cross-sectional area of the cavity is larger than that of the cavity opening and the cross-sectional area constant over the length of the cavity, FIG. 6c illustrates an example of a resonator where the cross-sectional area is larger than that of the cavity opening and the cross-sectional area increases over the length of the cavity, FIG. 6d illustrates an example of a resonator having an undulated shape and where the cross-sectional area and shape is essentially the same as that of the cavity opening, and FIG. 6e illustrates an example of a resonator where the cavity is provided with a transverse partition wall with a partition wall opening.

DETAILED DESCRIPTION OF THE INVENTION

Figure 1:
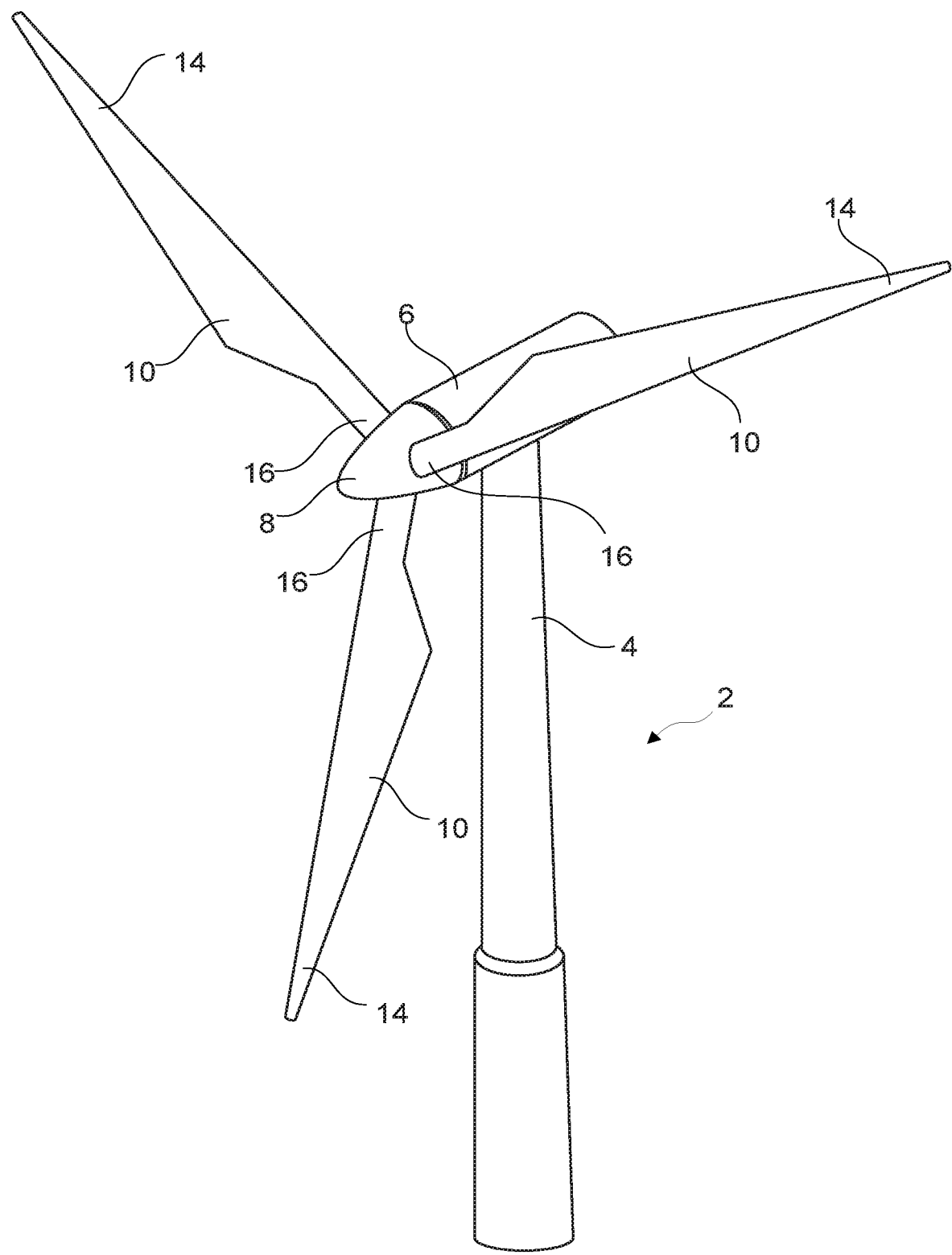
FIG. 1 is a diagrammatical perspective view of an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending essentially radially from the hub 8, each having a blade root 16 nearest the hub and a blade tip 14 furthest from the hub 8.

Figure 2:
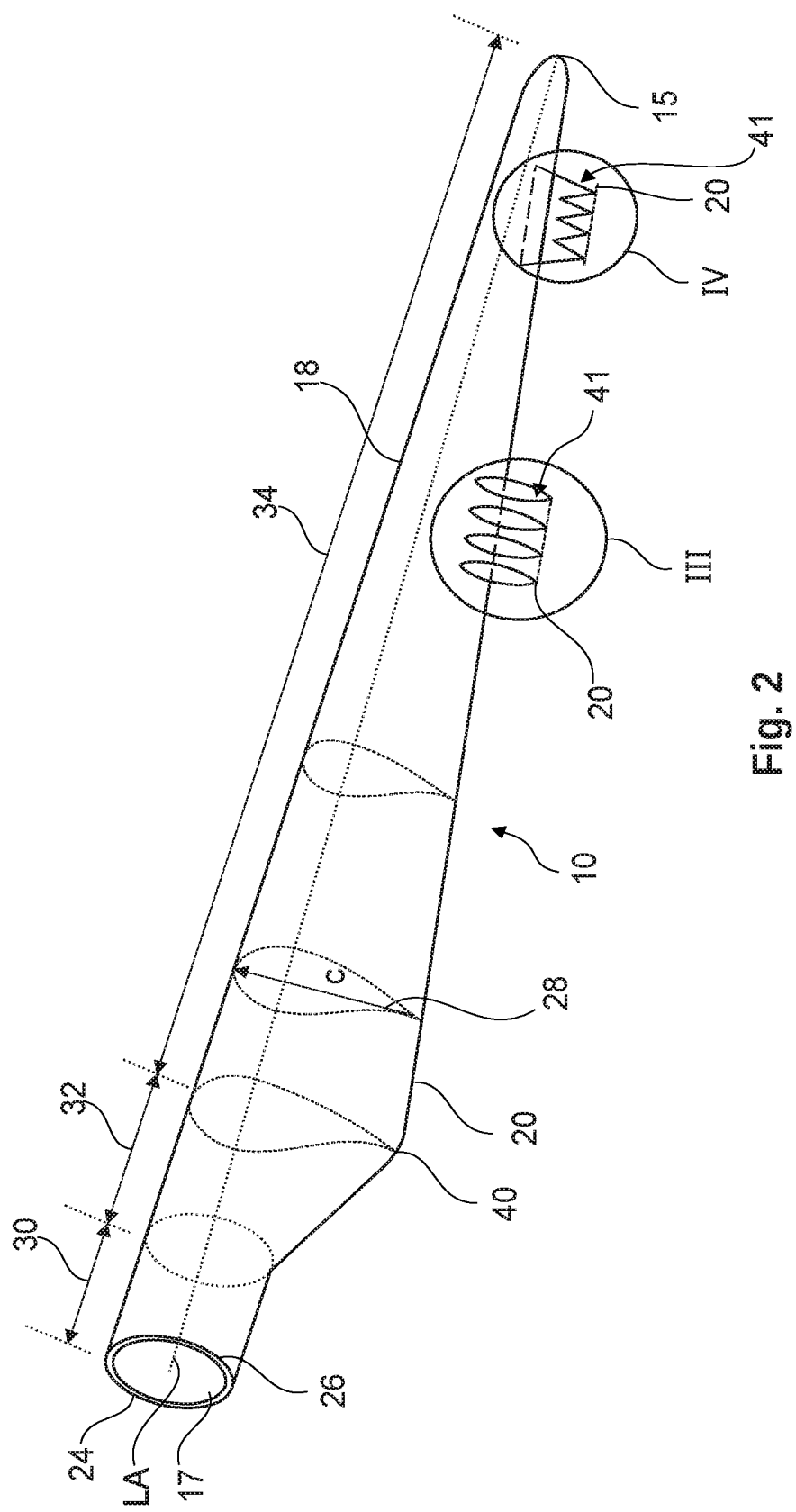
FIG. 2 is a diagrammatical perspective view of an exemplary wind turbine blade according to the present invention having a trailing edge comprising a serrated portion comprising a plurality of serrations, a noise reducing portion comprising acoustic resonators being located in the serrated portion.

FIG. 2 shows a schematic view of an exemplary wind turbine blade 10. The wind turbine blade 10 has the shape of a conventional wind turbine blade with a root end 17 and a tip end 15 as seen in a longitudinal direction along a longitudinal axis LA of the blade and a transverse direction transversely of the longitudinal direction. The blade comprises a root region 30 closest to the hub, a profiled or an airfoil region 34 furthest from the hub and a transition region 32 between the root region 30 and the airfoil region 34. Additionally, the blade 10 comprises a leading edge 18 facing the direction of rotation of the blade 10, when the blade is mounted on the hub, and a trailing edge 20 facing the opposite direction of the leading edge 18 and a local chord 28 having a chord length C as well as a chord plane extending through the local chord 28 perpendicular to the longitudinal axis LA of the blade. Further, the blade 10 has a noise reducing portion 41 comprising a serrated trailing edge portion 42 having a plurality of serrations 43, acoustic resonators being located in the noise reducing portion 41.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance from the hub. The airfoil region 34 has an airfoil profile with a chord 28 extending between the leading edge 18 and the trailing edge 20 of the blade 10. The length C of the chord decreases with increasing distance from the hub. A shoulder 40 of the blade 10 is defined as the position, where the blade 10 has its largest chord length C. The shoulder 40 is typically provided at the boundary between the transition region 32 and the airfoil region 34.

It should be noted, that the chords of the different sections of the blade normally do not lie in a common plane, since the blade may be twisted and/or curved (i.e., pre-bent), thus providing the chord plane with a correspondingly twisted and/or curved course, this being most often the case in order to compensate for the local velocity of the blade being dependent on the radius from the rotation axis.

The wind turbine blade 10 can typically comprise a blade shell comprising two blade shell parts or half shells, a first blade shell part and a second blade shell part, typically made of fibre-reinforced polymer. The wind turbine blade 10 may comprise additional shell parts, such as a third shell part and/or a fourth shell part. The first blade shell part is typically a pressure side 24 or upwind blade shell part. The second blade shell part is typically a suction side 26 or downwind blade shell part. The first blade shell part and the second blade shell part are fastened together with adhesive, such as glue, along bond lines or glue joints extending along the trailing edge 20 and the leading edge 18 of the blade 10. Typically, the root ends of the blade shell parts have a semi-circular or semi-oval outer cross-sectional shape. The blade shell parts define the aerodynamic shape of the wind turbine blade.

As shown in FIGS. 3, 3a, 3b, and 3c the noise reducing portion 41 comprises the trailing edge portion 42 having serrations 43 (e.g. four serrations) arranged adjacent to each other, such that a valley region 44 is formed between a first and a second adjacent serration of the plurality of serrations.

Figure 3:
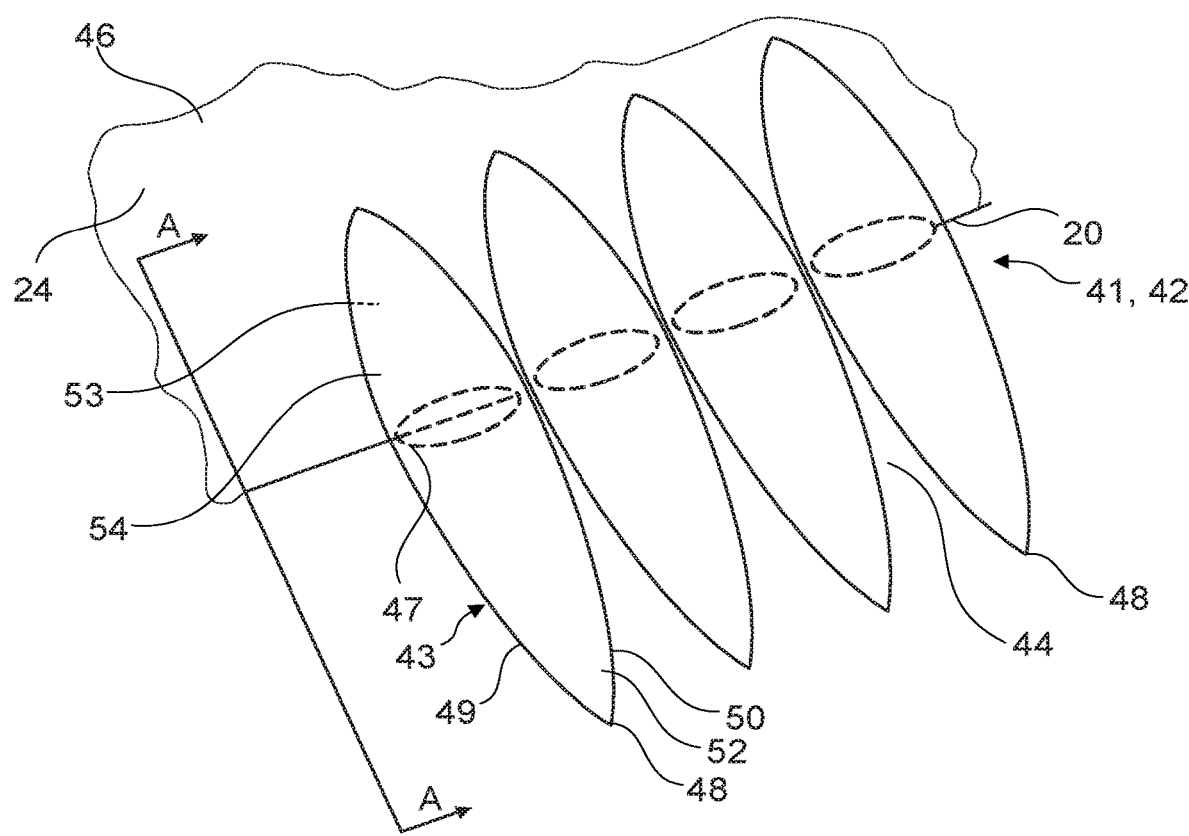
FIG. 3 is an enlarged diagrammatical view of the encircled area III in FIG. 2 having a first resonator arrangement.
Figure 3A:
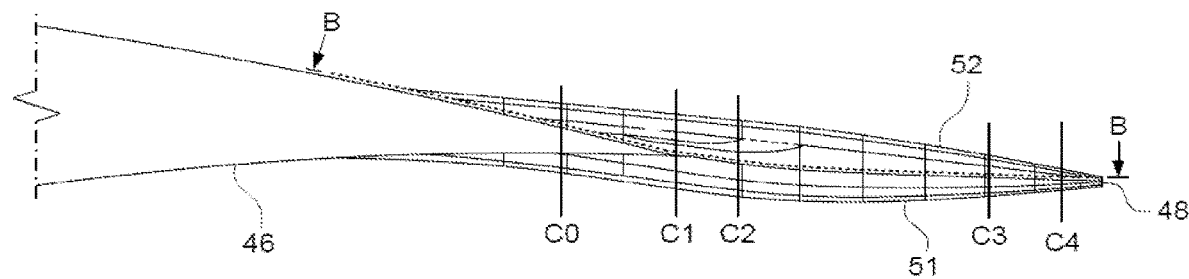
FIG. 3a is a diagrammatical partially sectional view along line A-A in FIG. 3.
Figure 3B:
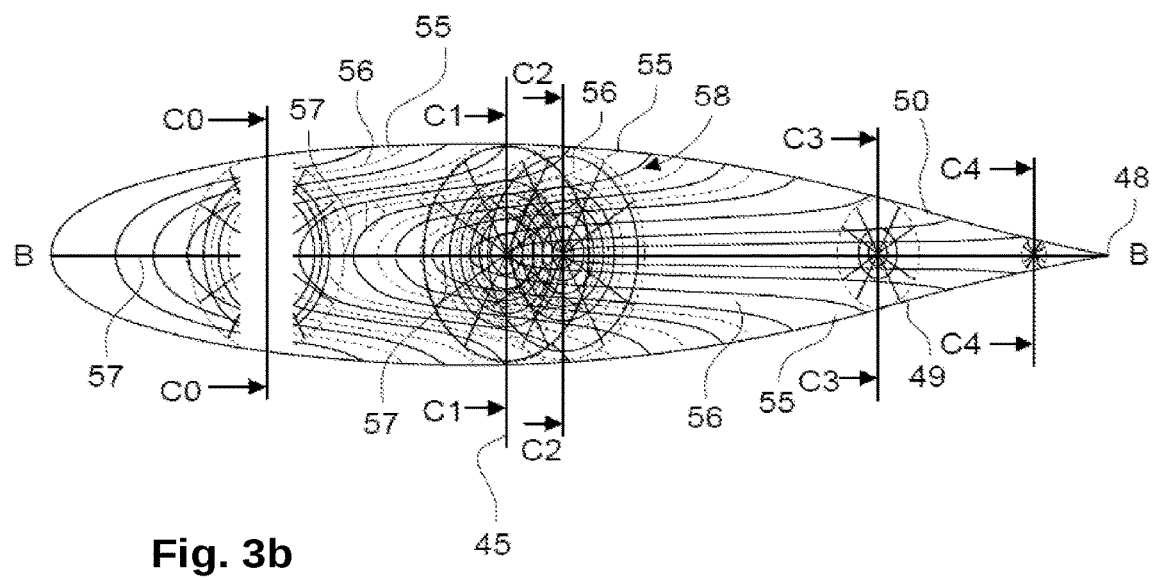
FIG. 3b is a diagrammatical-sectional view along the line or plane B-B in FIG. 3a and cross-sectional views along the lines CO-CO, C1-C1, C2-C2, C3-C3, C4-C4, respectively.

The serrated trailing edge may comprise more than four serrations and the trailing edge may be serrated over the entire length thereof. In the present example, the noise reducing portion 41 of the blade is formed by a premanufactured part being integrated in the blade in connection with the manufacturing of the blade. The premanufactured noise reducing portion 41 or serrations 43 of the blade can be added to a trailing edge 45 of a premanufactured blade 46 as an add-on part. However, the serrated trailing edge or serrated trailing edge portion could also be integrally formed with the blade during the manufacturing thereof. In the present example the noise reducing portion 41 or serrations 43 is/are premanufactured parts added to a previously manufactured blade 46 as add-on, as seen in FIG. 3a Each of the first and second serrations 43 comprises a base portion 47, an apex 48 located downstream of the base portion 47, a first lateral serration side 49 extending between a base portion 47 and the apex 48, a second lateral serration side 50 arranged opposite the first lateral serration side 49 and extending between the base portion 47 and the apex 48, a serration pressure side 51 extending between the base portion 47 the first lateral serration side 49 and the second lateral serration side 50, and a serration suction side 52 arranged opposite the serration pressure side 51 and extending between the base portion 47, the first lateral serration side 49 and the second lateral serration side 50.

The serration pressure side 51 can be considered a continuation of and forming a portion of the pressure side 24 of the blade 10, and the serration suction side 52 can be considered a continuation of and forming a portion of the suction side 26 of the blade 10.

On the other hand, the serration pressure side 51 and the serration suction side 52, can also be considered extending upstream of the base portion 47 of the serrations 43 as the serration suction side 52 upstream of the base portion 47 continues in an upstream tapering suction side bulge portion 54 and the serration pressure side 51 upstream of the base portion 47 continues in an upstream tapering pressure side bulge portion 53. Resonators can be arranged in the pressure side and the suction side upstream of the base portion 47 of the serrations 43, as explained below and shown in FIGS. 3a, 3b and 3c.

The serrations 43 have a tapering shape as seen from the base portion 47 towards the apex 48 and the shape can be at least essentially conical. At least one of the serrations 43 comprises a plurality of acoustic resonators 58, each having a cavity opening 55 in an exposed surface, and a cavity 56 having a length L between the opening 55 and the bottom 57 of the cavity 56 opposite the opening 55. The opening of the resonators disclosed in the present example is located in the lateral serration sides 49, 50. However, the serration openings may also be arranged in the serration pressure side 51 and/or the serration suction side 52. In the present example, the acoustic resonators have an undulated shape, more specifically essentially an S-shape, and where the bottom 57 is spaced span wise relative to the opening in order to provide the desired length of the cavity for reducing low frequencies. The resonators could also be considered a leg of an essentially U-shaped cavity being divided into two legs by a centrally arranged bottom and one of the legs having an opening in the first lateral serration side 49 and the other leg having an opening in the second lateral serration side 50.

Figure 3C:
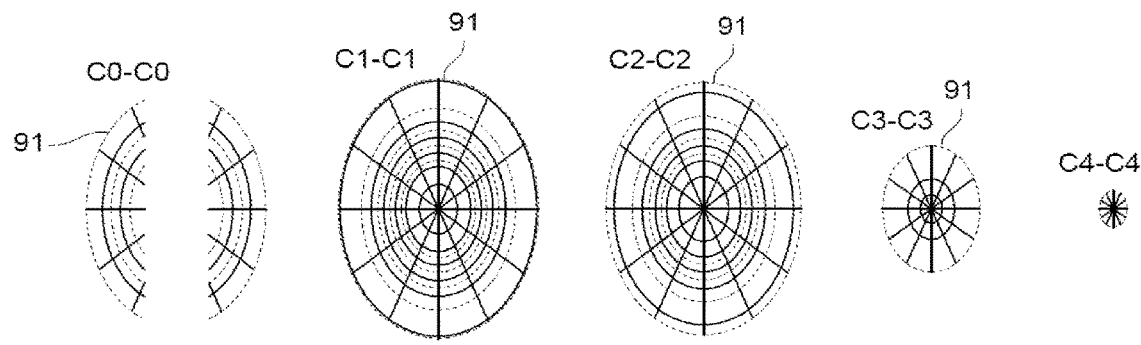
FIG. 3c is diagrammatical cross-sectional views along the lines CO-CO, C1-C1, C2-C2, C3-C3, C4-C4, respectively in FIG. 3b.
Figure 3D:
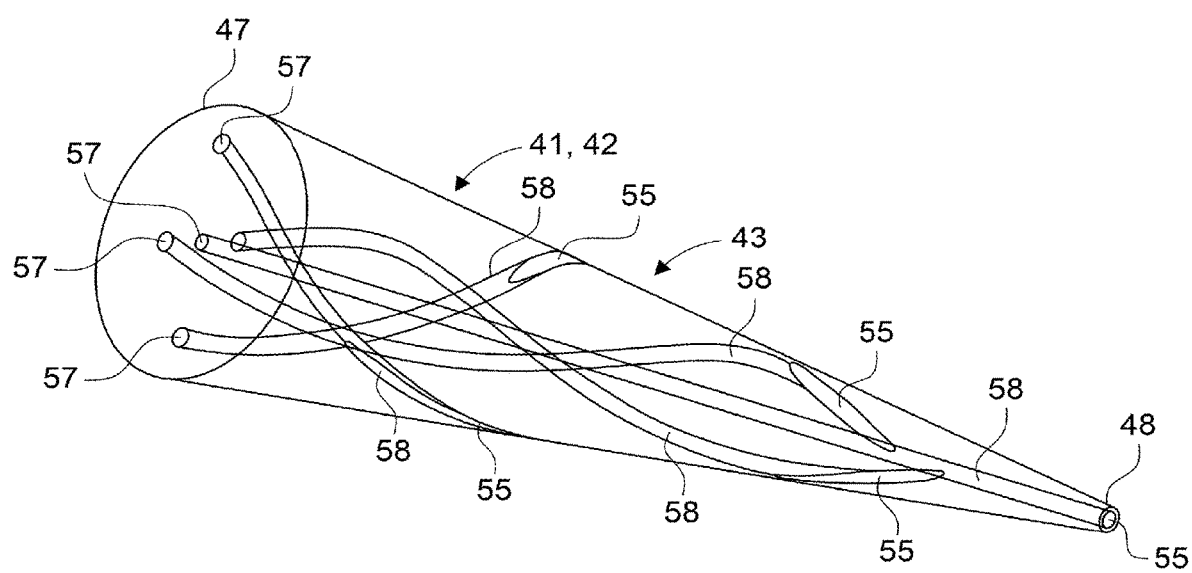
FIG. 3d is an enlarged perspective 3D Xray view illustrating an example of a serration similar to the serration shown in FIG. 3 and being provided with spiral-shaped resonators having spiral-shaped cavities.

Further, the essentially U-shaped cavity could also have a not centrally arranged bottom and thereby provide legs of different length. Additionally, the essentially U-shaped cavity can extend from one of the first and second lateral serration sides to the other one of said lateral serration sides, an opening being provided in one of said sides and a bottom in the other one of said lateral serration sides. The openings of the cavities are covered by an air permeable layer 91, such as a fabric layer or wire mesh or perforated screen, as shown in FIG. 3c FIG. 3d discloses a perspective X-ray view illustrating an example of a serration 43 similar to that shown in FIG. 3 and having a shape tapering as seen from the base portion 47 towards the apex 48. The serration 43 shown is provided with five resonators, four of the resonators being spiral-shaped with spiral-shaped cavities and one of the resonators being straight having a straight cavity. Each of the cavities extend from an opening 55 in the exposed noise reducing surface of the blade to a bottom 57 of the cavity 56 at the base portion 47 of the serration 43. The spiral-shaped cavities and the straight cavity have different lengths in order to abate different sound frequencies.

Figure 4:
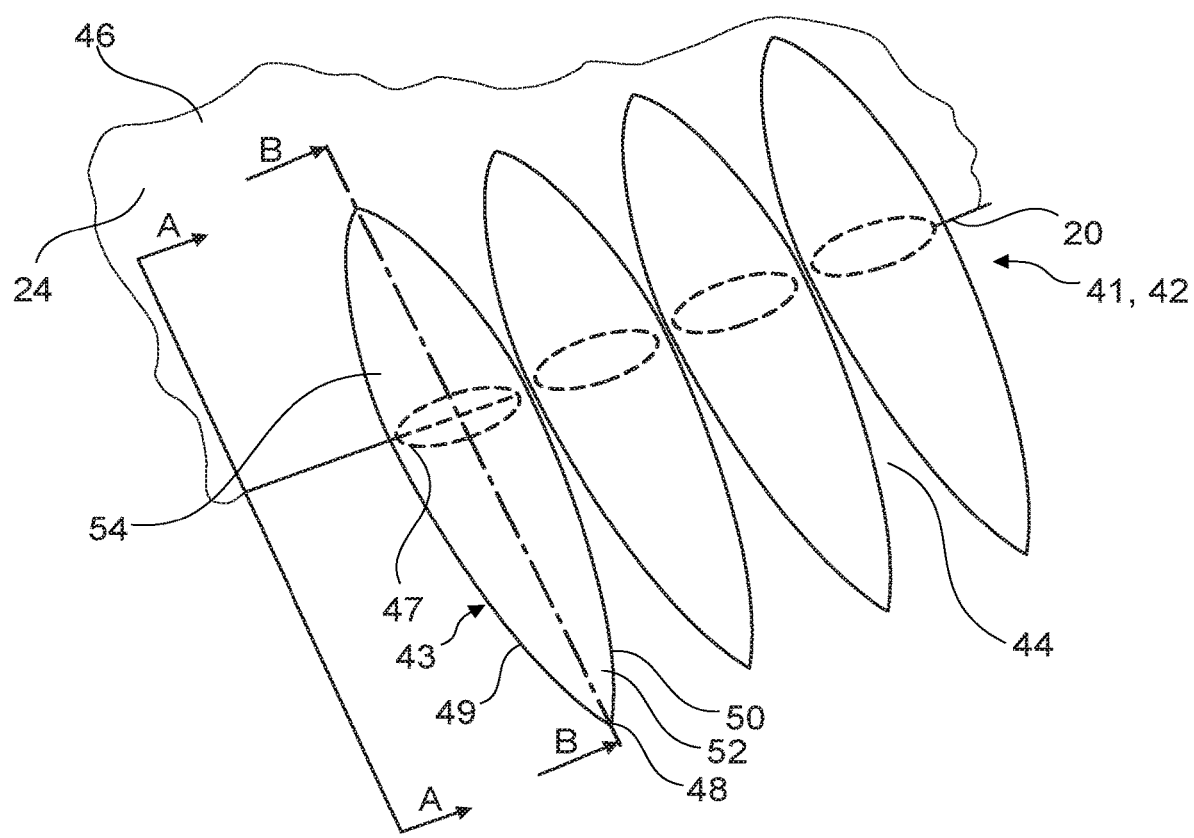
FIG. 4 is an enlarged diagrammatical view of the encircled area III in FIG. 2 having a second resonator arrangement.
Figure 4A:
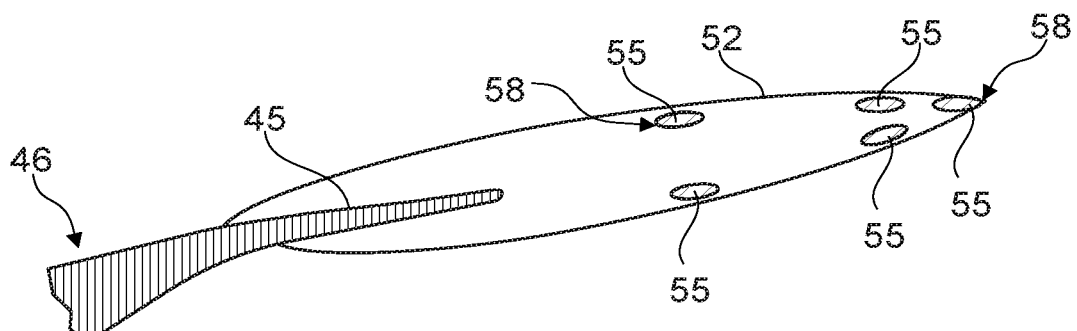
FIG. 4a is a diagrammatical partially sectional view along the line A-A in FIG. 4.
Figure 4B:
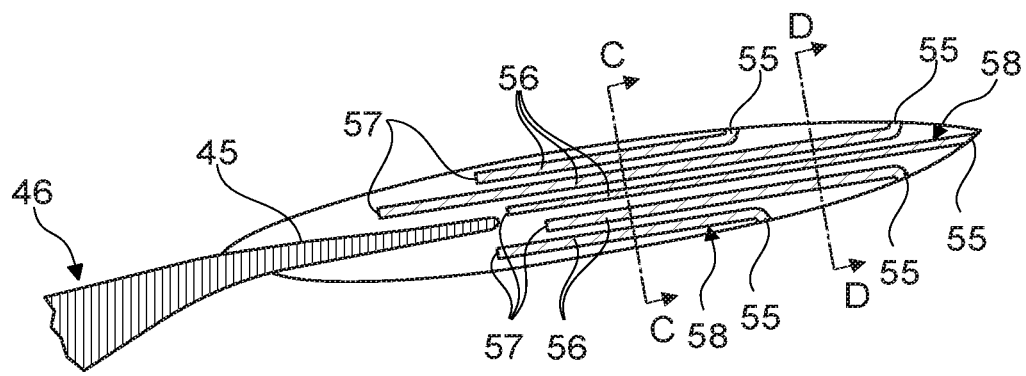
FIG. 4b is a diagrammatical partially sectional view along the line B-B in FIG. 4.

FIG. 4 is an enlarged diagrammatical view of the encircled area III in FIG. 2 having a second resonator arrangement different from that of FIGS. 3, 3a, 3b, 3c and 3d. As shown in FIGS. 4, 4a, 4b, 4c and 4d, the noise reducing portion 41 comprising the trailing edge portion 42 having four serrations 43 arranged adjacent to each other such that a valley region 44, is formed between a first and a second adjacent serration of the plurality of serrations. The serrated trailing edge may comprise more than four serrations and the trailing edge may be serrated over the entire length thereof. In the present example, the noise reducing portion 41 of the blade is formed by a premanufactured part being integrated in the blade in connection with the manufacturing of the blade. The premanufactured noise reducing portion 41 of the blade can be added to a trailing edge 45 of a premanufactured blade 46 as an add-on part. However, the serrated trailing edge or serrated trailing edge portion could also be integrally formed with the blade during the manufacturing thereof.

Each of the first and second serrations 43 comprises a base portion 47, an apex 48 located downstream of the base portion 47, a first lateral serration side 49 extending between a base portion 47 and the apex 48, a second lateral serration side 50 arranged opposite the first lateral serration side 49 and extending between the base portion 47 and the apex 48, a serration pressure side 51 extending between the base portion 47 the first lateral serration side 49 and the second lateral serration side 50, and a serration suction side 52 arranged opposite the serration pressure side 51 and extending between the base portion 47 of the first lateral serration side 49 and the second lateral serration side 50.

The serration pressure side 51 can be considered a continuation of and forming a portion of the pressure side 24 of the blade 10, and the serration suction side 52 can be considered a continuation of and forming a portion of the suction side 26 of the blade 10.

On the other hand, the serration pressure side 51 and the serration suction side 52, can also be considered extending upstream of the base portion 47 of the serrations 43, as the serration suction side 52 upstream of the base portion 47 continues in an upstream suction side bulge portion, such as an upstream tapering suction side bulge portion 54 and the serration pressure side 51 upstream of the base portion 47 continues in an upstream pressure side bulge portion, such as an upstream tapering pressure side bulge portion 53. Resonators can be arranged in the pressure side and the suction side upstream of the base portion 47 of the serrations 43.

Figure 4C:
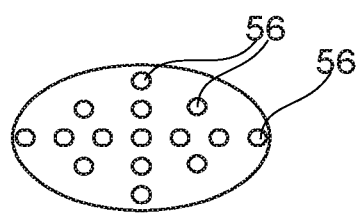
FIG. 4c is a diagrammatical sectional view along the line C-C in FIG. 4b.
Figure 4D:
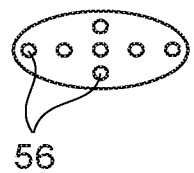
FIG. 4d is a diagrammatical sectional view along the line D-D in FIG. 4b.

The serrations 43 have a tapering shape as seen from the base portion 47 towards the apex 48 and the shape can be at least essentially conical. At least one of the serrations 43 comprises a plurality of acoustic resonators 58, each having a cavity opening 55 in an exposed surface and a cavity 56 having a length L between the opening 55 and the bottom 57 of the cavity 56 opposite the opening 55. The opening of the resonators disclosed in the present example is located in the lateral serration sides 49, 50. However, the serration openings may also be arranged in the serration pressure side 51 and/or the serration suction side 52. In the present example, the acoustic resonators are quarter wavelength resonators having an opening 55 and an elongated cavity 56 with the same cross-sectional area and shape. The resonators are of the type shown in FIG. 6a. Two openings 55 are arranged mutually spaced in each of the first and second lateral sides 49, 50 of the at least one serration 43, as seen in the direction from the base portion 47 towards the apex 48 of the serration 43. Although only openings of five resonators 58 are shown, each of the first and second lateral serration sides 49, 50 may comprise several resonators 58 and thereby openings 55, as indicated in FIG. 4c and FIG. 4d. The opening 55 of a fifth resonator 58 is arranged in the apex 48 of the serration. The elongated cavity 56 of each resonator 58 extends essentially parallel to or slanted relative the local chord. The length of the cavities of the resonators is different for obtaining a frequency band appropriate to abate the noise emitted by the adjacent area of the trailing edge.

Figure 7:
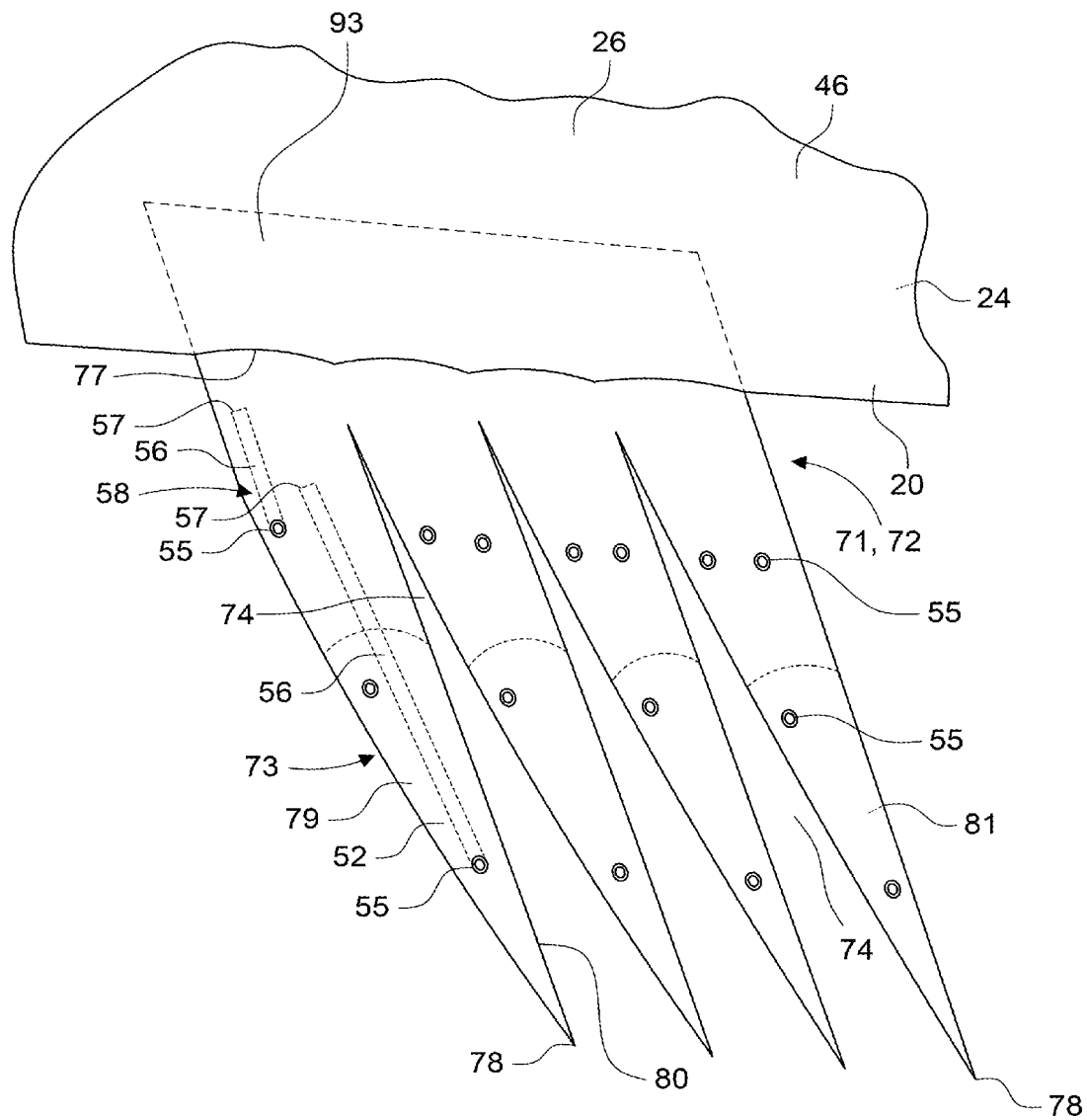
FIG. 7 illustrates an enlarged diagrammatical view of the encircled area IV in FIG. 2 disclosing a noise reducing portion comprising a trailing edge portion having a plurality of serrations with acoustic resonators.

FIG. 7 is an enlarged diagrammatical view of the encircled area IV in FIG. 2 and discloses a noise reducing portion 71 comprising a trailing edge portion 72 having four serrations 73, a valley region 74 being formed between adjacent serrations. In the present example the noise reducing portion 71 of the blade is formed by a premanufactured serrated trailing edge panel configured to be attached to the trailing edge of a premanufactured blade 76 as an add-on part. The premanufactured trailing edge panel 71 comprises an attachment section 93 configured for attaching the trailing edge panel 71 to one of the suction side and pressure side or both said sides of the premanufactured blade 76 at the trailing edge thereof. Additionally, the trailing edge panel comprises the serrations 73 extending downstream of the attachment section 93 when the trailing edge panel is attached to the premanufactured blade. The premanufactured serrated trailing edge panel coyl also be added to the blade during manufacturing of the blade by arranging the attachment portion 93 of the panel between the two blade halves of the blade during the adhesive connection of the two blade halves.

Each of the serrations 73 comprises a base portion 77, an apex 48 located downstream of the base portion 77, a first lateral serration side 79 extending between the base portion 77 and the apex 78, a second lateral serration side 80 arranged opposite the first lateral serration side 79 and extending between the base portion 77 and the apex 78, a serration pressure side 81 extending between the base portion 77 the first lateral serration side 79 and the second lateral serration side 80, and a serration a serration suction side 82 arranged opposite the serration pressure side 81 and extending between the base portion 77, the first lateral serration side 79 and the second lateral serration side 80.

The serrations 76 have a conical shape as seen from the base portion 77 towards the apex 78 and the cross-sectional shape changed from being flat at the base portion 77 to being essentially circular or elliptical at the apex in the example shown. However, it shall be noted that the cross-sectional shape of the serrations could also change so that the cross section at the apex was flat, elliptical rectangular with rounded side walls or had any desired cross-section. At least one of the serrations 73 comprises a plurality of acoustic resonators 58, each having a cavity opening 55 in an exposed surface and a cavity 56 having a length L between the opening 55 and the bottom 57 of the cavity 56 opposite the opening 55. The resonators are of the types shown in FIG. 6a to FIG. 6e or any other type. The openings 55 of the resonators 58 are arranged in the serration pressure side, the serration suction side, the first lateral serration side and/or the second lateral serration side. The resonators can also extend into the attachment section 93.

Figure 5:
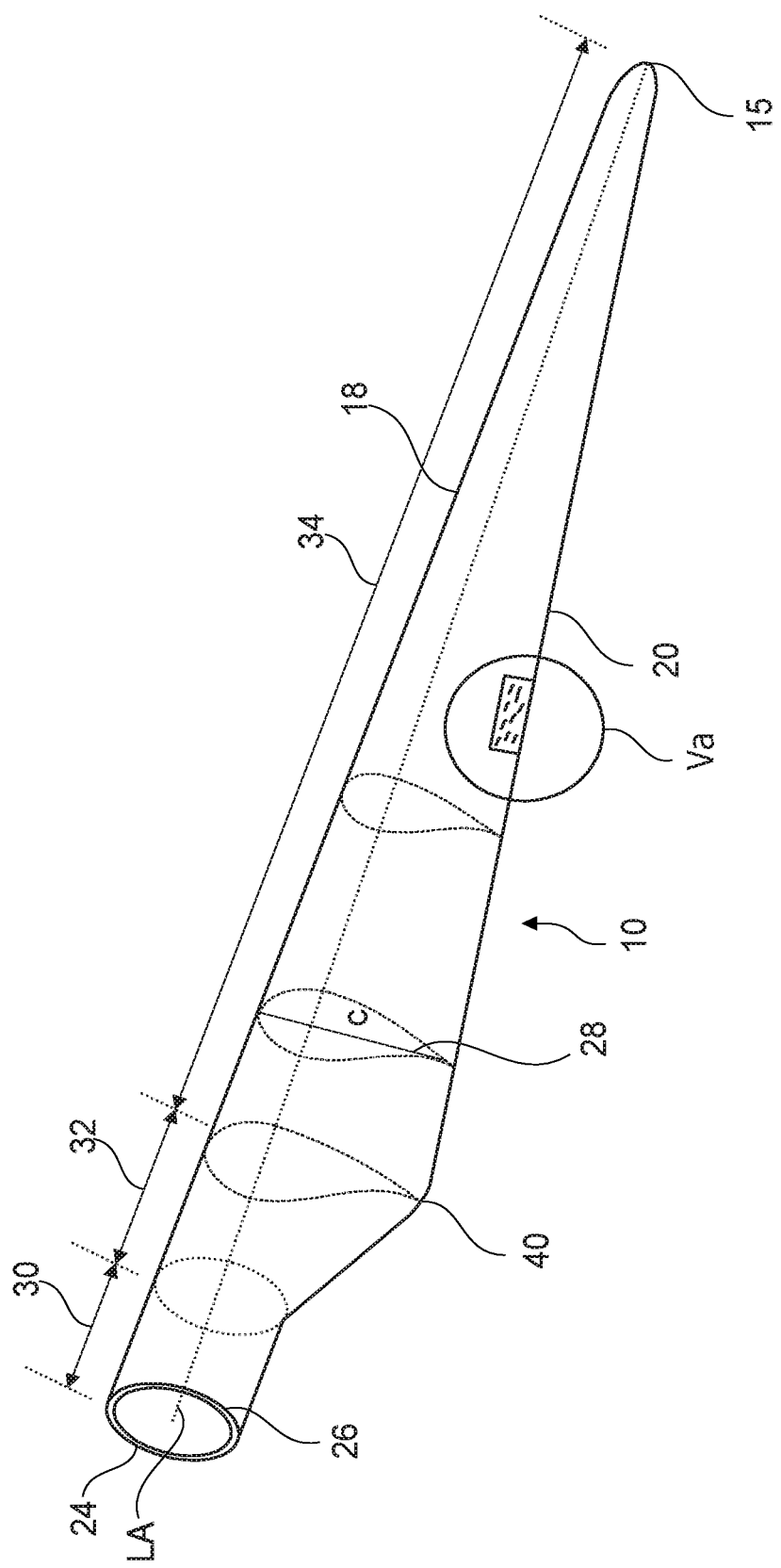
FIG. 5 is a diagrammatical perspective view of an exemplary wind turbine blade according to the present invention having a trailing edge comprising a straight portion, a noise reducing portion comprising acoustic resonators being located in a trailing edge portion adjacent to or at the trailing edge.
Figure 5A:
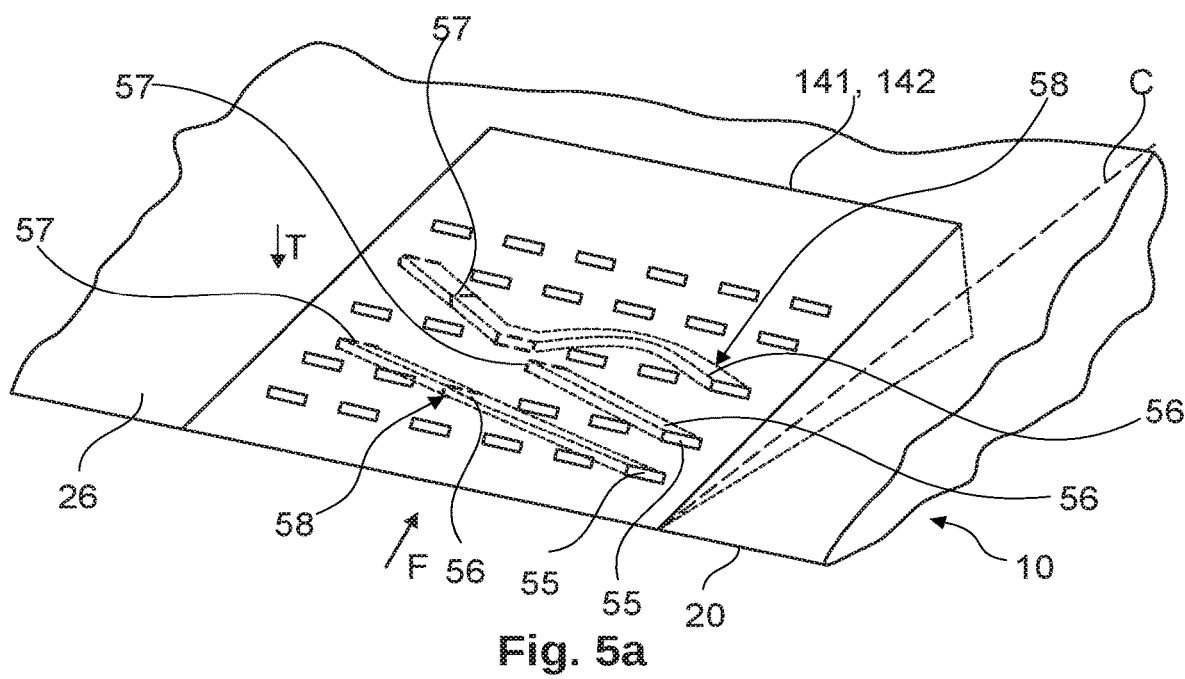
FIG. 5a is an enlarged diagrammatical view of the encircled area Va in FIG. 5.
Figure 5B:
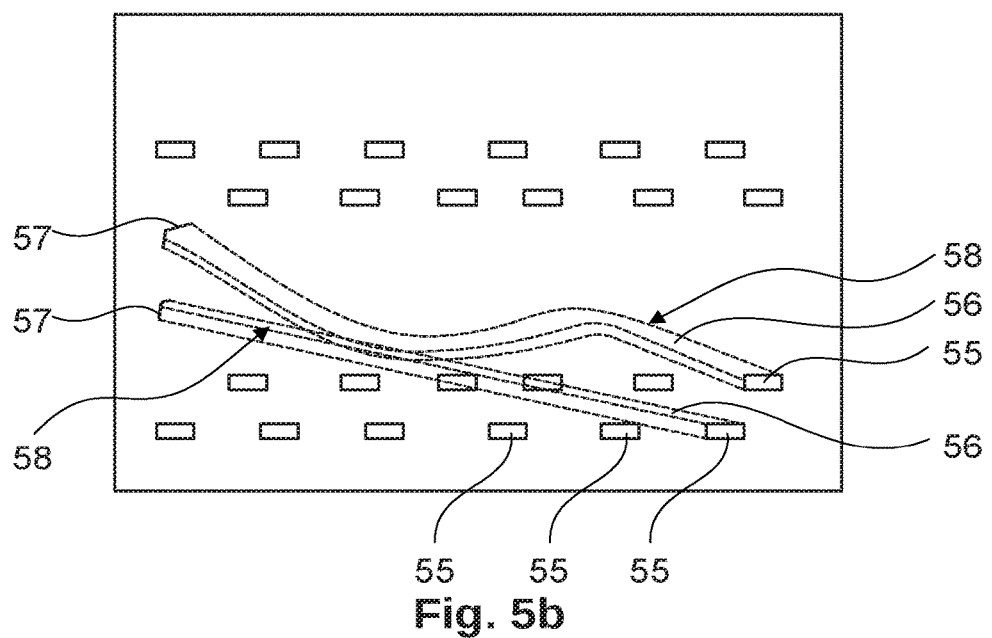
FIG. 5b is a diagrammatical top view as seen in the direction of the arrow T in FIG. 5a, FIG. 5c is a diagrammatical front view as seen in the direction of the arrow F in FIG. 5a, and FIG. 6 discloses a non-limiting diagrammatical sectional view of a non-limiting number of acoustic resonators.
Figure 5C:
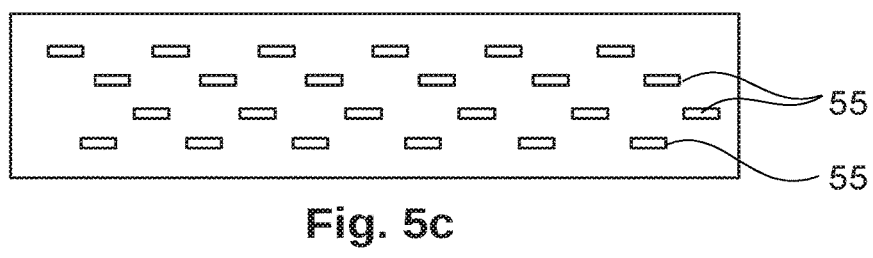

FIG. 5 is a diagrammatical perspective view of an exemplary wind turbine blade according to the present invention, the blade being identical with that shown in FIG. 2 except that the trailing edge does not comprise a serrated portion noise reducing portion with acoustic resonators. FIG. 5b and FIG. 5c are top views as seen in the direction of the arrow T in FIG. 5a and a front view as seen in the direction of the arrow F in FIG. 5a, respectively. The present exemplary blade has a trailing edge comprising a straight portion, the noise reducing portion 141 comprising acoustic resonators 58 located in a trailing edge region 142 adjacent to or at the trailing edge 20. The noise reducing portion 141 of the blade is formed by a premanufactured part being integrated in the blade in connection with the manufacturing of the blade. However, the straight trailing edge portion could also be integrally formed with the blade during the manufacturing thereof.

The noise reducing portion 141 comprises a plurality of acoustic resonators 58 arranged in an array of rows and columns. The resonators 58 shown are quarter wavelength resonators having an opening 55 in the suction side 26 and a cavity 56 being slanted span wise relative to the local chord C for obtaining sufficient length for abating low frequencies. Some of the cavities 56 of the resonators 58 have a rectilinear shape and are of the resonator type shown in FIG. 6a, other have an undulated shape for obtaining additional length, and are of the resonator type shown in FIG. 6d. The cavities 56 have different lengths between the opening 55 and the bottom 57 for obtaining a frequency band of the noise reducing portion 141 for abating the noise emitted by the adjacent area of the trailing edge of the blade.

Reference is now made to FIG. 6a-h disclosing non-limiting examples of acoustic resonators.

FIG. 6a illustrates an example of a resonator where the cross-sectional area and shape of the cavity 56 is essentially the same as that of the cavity opening 55. The resonator is a quarter wavelength resonator where the length L between the cavity opening 55 and the bottom 57 is larger than the transverse dimension of the cavity 56.

FIG. 6b illustrates an example of a resonator where the cross-sectional area of the cavity 56 is larger than that of the cavity opening 55 and the cross-sectional area of the cavity 56 is constant over the length of the cavity between the opening 55 and the bottom 57. The length L is longer than the transverse dimension of the cavity 56.

FIG. 6c illustrates an example of a resonator where the cross-sectional area of the cavity 56 is larger than that of the cavity opening 55 and the cross-sectional area of the cavity 56 increases over the length L of the cavity between the opening 55 and the bottom 57. The length of the cavity 56 is longer than the transverse dimension thereof.

FIG. 6d illustrates an example of a resonator having an undulated shape and where the cross-sectional area and shape of the cavity 56 is essentially the same as that of the cavity opening 55. The length L of the cavity between the opening 55 and the bottom 57 is longer than the transverse dimension of the cavity.

FIG. 6e discloses a resonator having a cavity comprising a transverse partition wall 59 between the bottom 57 and the opening 55 thereof, the partition wall 59 dividing the cavity into an outer cavity part 61 proximal to the cavity opening 55 and an inner cavity part 62 proximal to the cavity bottom 57 and being provided with at least one partition wall opening 60. The transverse dimension of the cavity opening is smaller than the transverse dimension of the outer cavity part 61 and the transverse dimension of the partition wall opening 60 is smaller than the transverse dimension of the inner cavity part. The outer cavity has a length L1 and the inner cavity has a length L2. As a result, the resonator can abate emitted sound of different wavelengths and frequencies by dimensioning the cavity and the cavity parts accordingly. It should be noted that the resonator can be provided with multiple inlet openings and that the partition wall can also be provided with multiple partition wall openings. Further, it should be noted, that the cavity of the resonator can be provided with more than one transverse partition wall between the inlet opening and the bottom.

Figure 6F:
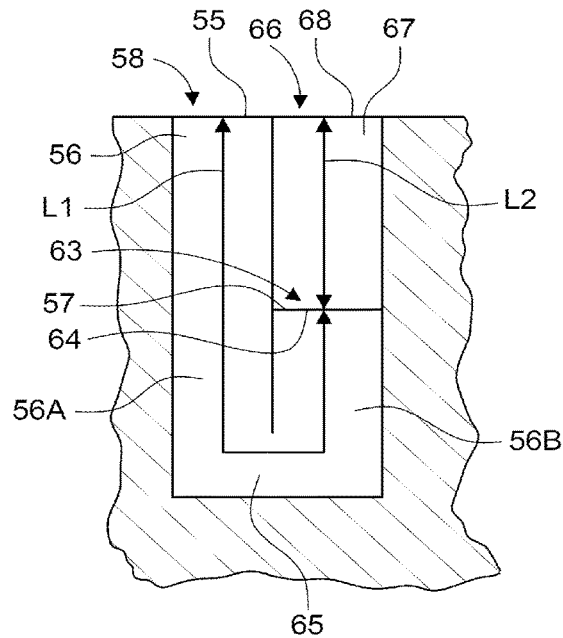
FIG. 6f illustrates an example of an essentially U-shaped resonator having a U-shaped cavity having a bottom wall forming a bottom of a second cavity of a second resonator formed in continuation of the resonator.

FIG. 6f illustrates an example of an essentially U-shaped resonator 58 having a U-shaped cavity 56 having a first cavity part 56B and a lower passage 65 between the first and the second cavity part.

The resonator 58 comprising an opening 55 in an exposed surface of the blade and an opposite bottom 57 of a bottom wall 63. The bottom wall 63 of the cavity of the resonator forms a second bottom 64 of a second resonator 66 formed in continuation of the resonator 58. The second resonator ss comprises a second cavity 67 having a second opening 68 in the exposed surface of the blade. The U-shaped cavity 56 has longer length L1 than the length L2 of the second cavity 67 of the second resonator 66.

Figure 6G:
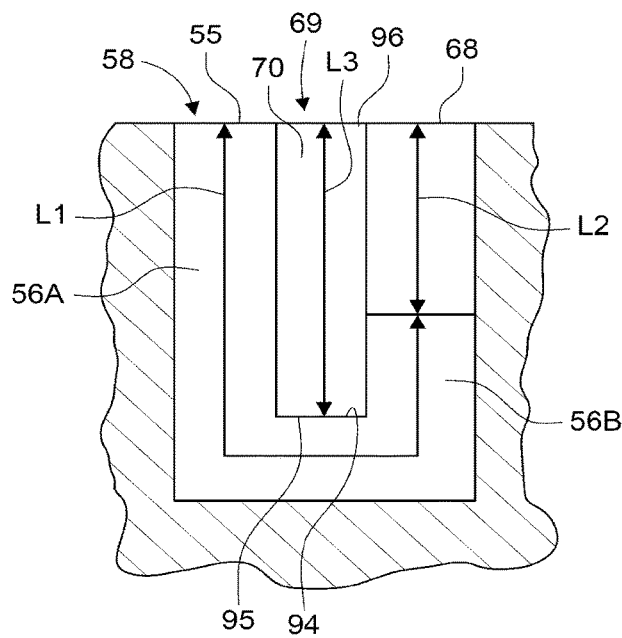
FIG. 6g illustrates an example of an essentially U-shaped resonator and a second resonator formed in continuation of the U-shaped resonator and a third resonator formed between the U-shaped resonator and the second resonator.

FIG. 6g discloses an acoustic resonator arrangement similar to that shown in FIG. 6f. However, the resonator arrangement of FIG. 6g differ from the resonator 58 shown in FIG. 6f in that the first and second cavity part 56A, 56B are mutually spaced and that a third resonator 69 having a third cavity 70 is arrange between the first and the second cavity part 56A, 56B of the resonator 58. The third resonator 69. The third resonator 69 comprises a third bottom 94 formed by a second bottom wall 95 and a third opening 96 in the exposed surface of the blade.

Figure 6H:
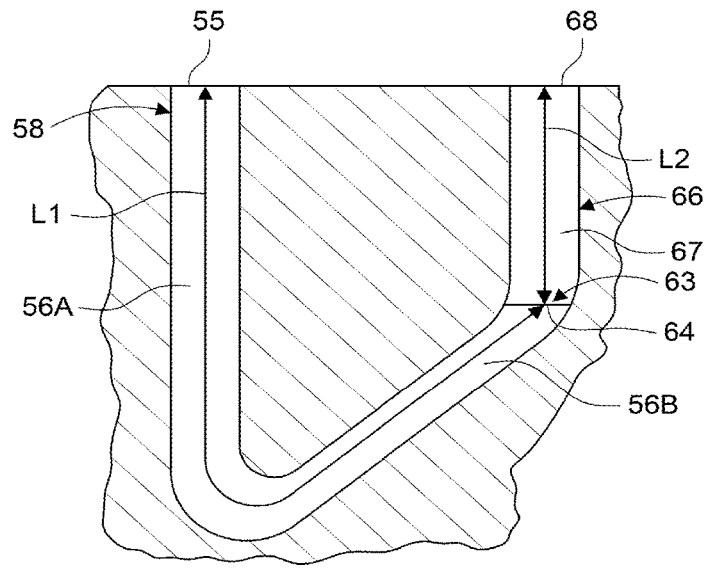
FIG. 6h illustrates a further example of an essentially U-shaped resonator and a second resonator formed in continuation of the U-shaped resonator.

FIG. 6h discloses a resonator arrangement similar to that of FIG. 6f. However, the resonator arrangement shown in FIG. 6h differs from that shown in FIG. 6f in that the shape of the u-Shaped resonator has a different shape than that shown in FIG. 6f in that the second cavity part 56B of the resonator is angled relative to the first cavity part 56A of the resonator and that the bottom wall 63 of the cavity forms the second bottom 64 of a second resonator 66 having a second cavity 67 spaced from the first cavity part 56A of the resonator 58. The second cavity 67 is provided with a second opening 68 in the exposed surface of the blade.

Exemplary embodiments of the present disclosure are set out in the following items:

1. Wind turbine blade having a profiled contour and comprising a pressure side and a suction side,
   a leading edge and a trailing edge, a chord having a chord length extending between the leading edge and the trailing edge, the blade extending in a spanwise direction between a root end and a tip end and having a longitudinal axis,
   wherein at least a portion of the blade located in a trailing edge region at or adjacent to the trailing edge is a noise reducing portion defining an exposed surface and comprising a plurality of sound reducing or sound absorbing acoustic resonators, each of the resonators comprising an opening in the exposed surface and a cavity having a length between the opening and a bottom of a bottom wall of the cavity opposite the opening, the opening to the cavity having an opening cross-sectional shape defining an opening cross-sectional area and the cavity having a cavity cross-sectional shape defining a cavity cross-sectional area.

2. Wind turbine blade according to item 1, wherein the cross-sectional area of the cavity is essentially constant over the entire length thereof.

3. Wind turbine blade according to any of the preceding items, wherein the cavity has an elongated shape, the length of the cavity being longer than the transverse dimension of the cavity.

4. Wind turbine blade according to any of the preceding items, wherein the cavity comprises one or more transverse partition walls between the bottom and the opening thereof, the partition wall(s) dividing the cavity into two or more cavity parts, such as an outer cavity part proximal to the cavity opening and an inner cavity part proximal to the cavity bottom, and each partition wall being provided with at least one dividing wall opening.

5. Wind turbine blade according to any of the preceding items, wherein at least some of the cavity openings are covered by an air permeable layer, such as a fabric layer or a wire mesh or a perforated screen.

6. Wind turbine blade according to any of the preceding items, wherein at least one of the plurality of resonators is a quarter wavelength resonator, such as a resonator with a cavity having constant cross-sectional Dimension, and having a cross-sectional dimension being smaller than the length, such as at least 4, 6, 8 or 10 times smaller than the length of the cavity.

7. Wind turbine blade according to any of the preceding items, wherein the cavity of at least one resonator of the plurality of resonators, such as a resonator having an essentially straight cavity, is slanted relative to the local chord, such as slanted in span wise direction.

8. Wind turbine blade according to any of the preceding items, wherein at least one of the plurality of resonators is curved, i.e. comprise a cavity having a cavity axis being curved for obtaining the desired length of the cavity.

9. Wind turbine blade according to item 8, wherein at least one of the plurality of resonators is essentially spiral-shaped having a spiral shaped cavity.

10. Wind turbine blade according to item 8, wherein at least one of the plurality of resonators is U-shaped having a U-shaped cavity comprising a first cavity part and a second cavity part and a passage between the first and the second cavity part.

11. Wind turbine blade according to any of the preceding items, wherein the bottom wall of the cavity of the resonator forms a second bottom of a second cavity of a second resonator formed in continuation of the resonator, the second sound absorbing or reducing resonator comprising a second opening in the noise reducing exposed surface of the blade.

12. Wind turbine blade according to any of the preceding items, wherein the trailing edge comprises at least one serrated portion extending at least over a portion between the tip and the root of the blade, the serrated portion comprising a plurality of serrations including a first serration and a second serration, and the noise reducing portion is located in or comprises at least one serrated portion, at least some of the resonators being arranged in the first and/or second serration.

13. Wind turbine blade according to item 12, wherein each of the first serration and the second serration comprises:
a base portion,
an apex located downstream of the base portion,
a first lateral serration side extending between a base portion and the apex,
a second lateral serration side arranged opposite the first lateral serration side and extending between the base portion and the apex,
a serration pressure surface side extending between the base portion the first lateral serration side and the second lateral serration side, and
a serration suction side arranged opposite the serration pressure side and extending between the base portion, the first lateral serration side and the second lateral serration side.

14. Wind turbine blade according to item 12 or 13, wherein at least some of the resonators arranged in the first and/or the second serration are arranged in the first lateral serration side and/or the second lateral serration side.

15. Wind turbine blade according to any of the preceding items 12-14, wherein at least some of the resonators arranged in the first and/or the second serration are arranged in the serration pressure side and/or the serration suction side.

16. Wind turbine blade according to any of the preceding items, wherein the trailing edge comprises a straight portion extending at least over a portion between the tip and the root of the blade, and the noise reducing portion is located upstream of the straight portion.

17. Wind turbine blade according to any of the preceding items, wherein the noise reducing portion of the blade is formed by a premanufactured part being integrated in the blade.

18. Wind turbine blade according to item 17, wherein the premanufactured part is added to an existing previous manufactured blade as an add-on or retrofitted part and thereby integrated in or on the blade after manufacturing of the blade.

19. Wind turbine blade according to any of the preceding items, wherein the cross-sectional shape of the cavity is essentially the same as that of the cavity opening.

LIST OF REFERENCE NUMERALS 2 wind turbine
4 tower
6 nacelle
8 hub
10 blade
14 blade tip
15 tip end
16 blade root
17 root end
18 leading blade edge
20 trailing blade edge
24 pressure side
26 suction side
28 local chord
30 root region
32 transition region
34 airfoil region
40 shoulder
41, 71 noise reducing portion
42, 72 trailing edge portion
43, 73 serration
44, 74 valley region
45 trailing edge of premanufactured blade
46, 76 premanufactured blade
47, 77 base portion
48, 78 apex
49, 79 first lateral serration side
50, 80 second lateral serration side
51, 81 serration pressure side
52, 82 serration suction side
53 pressure side bulge
54 suction side bulge
55 opening
56 cavity
56A first cavity part
56B second cavity part
57 bottom
58 acoustic resonator
59 partition wall
60 partition wall opening
61 outer cavity part
62 inner cavity part
63 bottom wall
64 second bottom
65 passage
66 second resonator
67 second cavity
68 second opening
69 third resonator
70 third cavity
91 permeable layer
93 attachment section
94 third bottom
95 second bottom wall
96 third opening
141 noise reduction portion
142 trailing edge region
L length of cavity
L1 length of outer cavity part
L2 length of inner cavity part
LA longitudinal axis

The invention claimed is:

1. A wind turbine blade having a profiled contour and comprising a pressure side and a suction side, a leading edge and a trailing edge, a chord having a chord length extending between the leading edge and the trailing edge, the blade extending in a spanwise direction between a root end and a tip end and having a longitudinal axis,
wherein at least a portion of the blade located in a trailing edge region at or adjacent to the trailing edge is a noise reducing portion defining an exposed surface and comprising a plurality of sound reducing or sound absorbing acoustic resonators, each of the resonators comprising an opening in the exposed surface and a cavity having a length between the opening and a bottom of a bottom wall of the cavity opposite the opening, the opening to the cavity having an opening cross-sectional shape defining an opening cross-sectional area and the cavity having a cavity cross-sectional shape defining a cavity cross-sectional area,
wherein the cavity of at least one resonator of the plurality of resonators is slanted in span wise direction relative to the local chord, and/or
wherein at least one of the plurality of resonators is curved and comprises a cavity having a cavity axis being curved for obtaining a desired length of the cavity.

2. The wind turbine blade according to claim 1, wherein the cross-sectional area of the cavity is constant over the entire length thereof.

3. The wind turbine blade according to claim 1, wherein the cavity has an elongated shape, the length of the cavity being longer than a transverse dimension of the cavity.

4. The wind turbine blade according to claim 1, wherein the cavity comprises one or more transverse partition walls between the bottom and the opening thereof, the partition wall(s) dividing the cavity into two or more cavity parts and each partition wall being provided with at least one dividing wall opening.

5. The wind turbine blade according to claim 1, wherein at least some of the cavity openings are covered by an air permeable layer.

6. The wind turbine blade according to claim 1, wherein at least one of the plurality of resonators is a quarter wavelength resonator.

7. The wind turbine blade according to claim 1, wherein at least one of the plurality of resonators is spiral-shaped having a spiral shaped cavity.

8. The wind turbine blade according to claim 1, wherein at least one of the plurality of resonators is U-shaped having a U-shaped cavity comprising a first cavity part and a second cavity part and a passage between the first and the second cavity part.

9. The wind turbine blade according to claim 1, wherein the bottom wall of the cavity of the at least one resonator of the plurality of resonators forms a second bottom of a second cavity of a second resonator formed in continuation of the at least one resonator, the second resonator comprising a second opening in the noise reducing exposed surface of the blade.

10. The wind turbine blade according to claim 1, wherein the trailing edge comprises at least one serrated portion extending at least over a portion between the tip and the root of the blade, the at least one serrated portion comprising a plurality of serrations including a first serration and a second serration, and the noise reducing portion is located in or comprises the at least one serrated portion, at least some of the resonators being arranged in the first serration and/or the second serration.

11. The wind turbine blade according to claim 10, wherein each of the first serration and the second serration comprises:
a base portion;
an apex located downstream of the base portion;
a first lateral serration side extending between a base portion and the apex;
a second lateral serration side arranged opposite the first lateral serration side and extending between the base portion and the apex;
a serration pressure surface side extending between the base portion the first lateral serration side and the second lateral serration side; and
a serration suction side arranged opposite the serration pressure side and extending between the base portion, the first lateral serration side and the second lateral serration side.

12. The wind turbine blade according to claim 10, wherein at least some of the resonators arranged in the first and/or the second serration are arranged in the first lateral serration side and/or the second lateral serration side.

13. The wind turbine blade according to claim 10, wherein at least some of the resonators arranged in the first and/or the second serration are arranged in the serration pressure side and/or the serration suction side.

14. The wind turbine blade according to claim 10, wherein the trailing edge comprises a straight portion extending at least over a portion between the tip and the root of the blade, and the noise reducing portion is located upstream of the straight portion.

15. The wind turbine blade according to claim 10, wherein the noise reducing portion of the blade is formed by a premanufactured part being integrated in the blade.

16. The wind turbine blade according to claim 15, wherein the premanufactured part is added to an existing previous manufactured blade as an add-on or retrofitted part and thereby integrated in or on the blade after manufacturing of the blade.

17. The wind turbine blade according to claim 10, wherein the cross-sectional shape of the cavity is the same as that of the cavity opening.

18. The wind turbine blade according to claim 1, wherein the at least one resonator of the plurality of resonators comprises a resonator having a straight cavity.

19. The wind turbine blade according to claim 6, wherein the at least one of the plurality of resonators comprises a resonator with a cavity having constant cross-sectional dimension and having a cross-sectional dimension smaller than the length.

20. The wind turbine blade according to claim 19, wherein the cross-sectional dimension is at least four times smaller than the length of the cavity.

* * * * *